United States Patent Office 2,748,900
Patented June 5, 1956

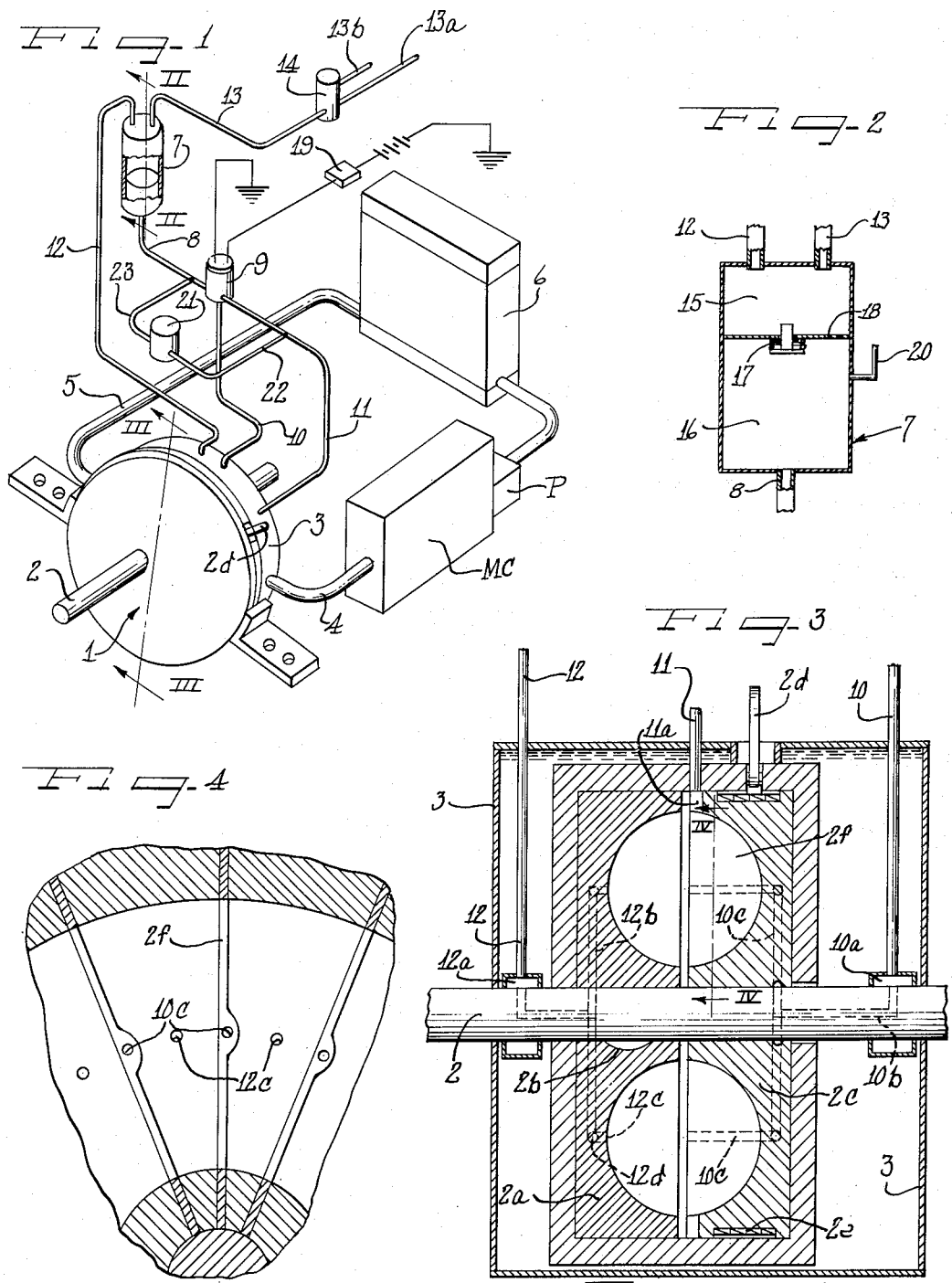

2,748,900

FLUID CONTROL SYSTEM FOR TORQUE ABSORBING AND TRANSMITTING COUPLING

James H. Booth, Corunna, and Edward J. Herbenar, Detroit, Mich., assignors to Thompson Products, Inc., Cleveland, Ohio, a corporation of Ohio Application September 18, 1952, Serial No. 310,262

9 Claims. (Cl. 188—90)

The present invention contemplates the provision of combined hydrodynamic braking and motor heating means for use with vehicles. More specifically, the invention relates to a fluid coupling type of hydrodynamic braking means utilizing a high speed loading and unloading system under the influence of engine, or other, vacuum means, and which is provided with an overload bypass means for the prevention of an overloading of the brake.

It has long been a problem in the automotive art and particularly with respect to large heavy duty vehicles that extra auxiliary brake means are required for the handling of the vehicle on down hill grades. While the service brakes may be enlarged so as to take the entire load, such course of action renders the service brakes very costly, quite complex and generally much larger than required for general operation of the vehicle.

A further problem which is common with vehicles of the type above mentioned in that on long down hill grades their internal combustion engines are idle with only a fraction of the usual load being placed upon them. Under these conditions the engine cooling system tends to be too large for the cooling needs of the idling engine and the motor temperature consequently drops to an inefficient level.

It is, therefore, an object of the present invention to provide an auxiliary braking system which corrects the defects above mentioned.

Another object of the present invention is the provision of a control system for fluid brakes which is unusually efficient and fast acting.

A further object of the present invention is to provide a novel control system for such a combined braking and engine heating system.

Yet another object of the present invention is to provide a novel control system for an auxiliary hydrodynamic braking system for vehicles which comprises a vacuum controlled hydrodynamic brake and which also provides an overload release mechanism which prevents an excessive load from being placed upon the auxiliary brake.

Another feature of the present invention is the provision of a novel combined accumulator, coupling bleed line fluid trap and vacuum fluid coupling loading system.

Still a further feature of the present invention is the provision of a semi-automatic auxiliary brake system for heavy duty vehicles.

A further object of the present invention is to provide an extremely simple braking system requiring no external power source for application of the brakes, thereby utilizing a minimum of outside power.

Still other and further objects of the present invention will appear to those skilled in the art from a consideration of the attached drawings wherein we have shown by way of illustrative example a preferred embodiment of our invention.

On the drawings:

Figure 1 is a schematic diagram of the hydrodynamic braking system of the present invention showing the controls thereof and their interconnection in the system;

Figure 2 is a cross-sectional view of the novel combined accumulator and vacuum source utilized in our invention and taken along the lines II—II of Figure 1;

Figure 3 is a cross-sectional view of the hydrodynamic braking unit utilized with the present invention; and Figure 4 is a partial cross-sectional view taken along the lines IV—IV of Figure 3.

As shown on the drawings:

As is shown in Figure 1, we provide a hydrodynamic braking unit generally indicated at 1 having an input shaft 2 which extends completely through the unit 1. It is contemplated that in vehicle installations of the usual sort the shaft 2 will be the drive shaft, commonly referred to as the propeller shaft. However, on many of the larger vehicles used today, tandem drive arrangements are utilized in which the drive shaft extends to a stub end at the rear of the tandem drive arrangement. In such installations it is feasible and often desirable to utilize the stub end as the input shaft 2 of the hydrodynamic brake of the present invention. In these latter installations it is then unnecessary to extend the shaft completely through the coupling and it is possible to eliminate the extension of the shaft 2 passing through the rear of the coupling.

The hydrodynamic brake, which comprises fluid coupling elements to be described later, is water jacketed at 3 for cooling purposes. Conduits 4 and 5 circulate water through the water jacket 3 and carry the heated water to the usual vehicle radiator 6. While the usual vehicle radiator may be utilized, it is possible to use an auxiliary radiator if the advantages of increased heat to the engine are not to be utilized. The actual conventional automotive power plant or motor is not shown in the drawings, but the cooling system of the motor is diagrammatically shown at MC with the conduit 4 passing therethrough.

In order to provide flow of the cooling water, the conventional circulating pump used in the cooling systems of most vehicles and which is indicated at P, is utilized. However, in vehicles not using a circulating pump the thermoconvective currents will usually be sufficient to provide adequate circulation for the present system.

The novel control system disclosed in the present invention comprises an accumulator 7, which will be fully described later, which acts as a source of fluid for use in the hydrodynamic fluid coupling brake 1. Fluid from the accumulator 7 gravitates to the conduit 8 which leads to a conventional three way valve 9. The three way valve 9 selectively operates to connect either the loading or filling conduit 10 or the unloading or emptying conduit 11 to the source 8. As is schematically shown, the control valve 9 is electrically actuated so that when current is supplied to the valve 9, it will be actuated into a position wherein the conduits 8 and 10 are interconnected and when current is cut off the conduits 8 and 11 will be connected.

A vacuum bleed line 12 is provided between the fluid coupling of the hydrodynamic brake 1 and the top portion of the accumulator. The conduit 13 also enters the accumulator and supplies a source of vacuum to the bleed line 12 from the conduit 13a. As may be seen from Figure 1, the conduit 13 is under the control of a control valve 14 which may be manually operated either directly or by means of an electrical solenoid. The conduit 13a is connected to the vacuum of the intake manifold of the vehicle in which the present system is to be utilized. The valve 14 is a conventional three-way valve which in its "on" or operative position connects conduits 13 and 13a and which in its "off" position connects the conduit 13 with the vent 13b leading to the atmosphere.

As may be seen from Figure 2, the accumulator utilized in the control system of this invention comprises a container having upper and lower levels 15 and 16. A check valve 17 is provided in a partition 18 which divides the container horizontally into the chambers 15 and 16. The check valve 17 will permit fluid to pass downwardly, but will not permit fluid to pass from the chamber 16 to the chamber 15. At the top of the chamber 15 the bleed conduit 12 is connected. Immediately adjacent this connection is the connection of the vacuum line 13. At the bottom of the chamber 16 a connection is provided for the passage of fluid to the conduit 8 for passage to or from the hydrodynamic torque absorber 1. It will be apparent therefore that should any fluid get into the bleed line 12 it will be trapped in the chamber 15 and upon sufficient accumulation will flow back into compartment 16 rather than into the source 13.

While various types of torque absorbers could be utilized in conjunction with the control system herein disclosed, a preferred type is shown in Figures 3 and 4. In these figures the torque absorber is shown to comprise an input drive shaft 2 which is fixedly secured to an impeller 2a by means of a key 2b. Rotatably mounted on the shaft 2 is the driven element 2c. The member 2c may be braked by means of any conventional brake, for example, one having a friction brake band 2e which can be contracted about the outer periphery of the member 2c by a manual cam lever 2d to securely lock the member 2c against rotation when the torque absorber system is to be utilized. When the absorber is to be in frequent or constant use the brake 2e is placed in, and left in the brake on position.

As shown in the exemplary diagram of Figure 3, a conventional collar 12a is provided for connecting the bleed line 12 to the bleed conduit 12b which is placed in the impeller 2a which rotates therewith. The bleed line 12b enters the area between the coupling members 2a and 2c at a point at the bottom of, or at a point along the inner surface, of the cups in the torus of the impeller. As shown at 12c, we have provided inlets at the bottom of the cups and have fed the vacuum inlets by a header conduit 12d.

Loading conduit 10 feeds into the collar 10a which in turn feeds into the line 10b in the shaft 2. The line 10b connects to the conduit 10c in the driven element 2c by means of conventional rotating collar-type connections. As may be seen from the dotted lines of Figure 3, the conduit 10c forms a header conduit which empties into the cavity between the rotors 2a and 2c at the center or median point of the annulus or torus formed by the two rotors and through the back side of one or more of the vanes 2f.

The unloading conduit 11 is connected at the outer periphery of the rotor and is fed by means of the conduit 11a provided in the periphery of the rotor 2c. In operation, the vehicle is driven in a conventional manner until such time as it is desired to utilize the auxiliary brake of the present invention. Such time generally occurs when the vehicle is at the top of an extremely long hill or grade. The vehicle is then in a position wherein it is desired that large braking capacity be had and also, it is desired that the engine temperature be maintained at a constant, efficient, high level.

The operator of the vehicle, therefore, opens the control valve 14 to introduce vacuum into the conduit 13. He also then actuates the valve 9 to connect the conduits 8 and 10 by actuating the switch 19 into the closed position. With the controls in these positions the vacuum will be induced in the working compartment of the torque absorber 1 through the conduits 12 and 13 as connected by the upper chamber 15 of the accumulator 17. This vacuum will be very high since the power plant of the vehicle will be idling on the down hill grade and throttle is completely closed. The vacuum in the torque absorber 1 causes a large differential in pressure between the pressure on the surface of the fluid in the chamber 16 of the accumulator 7 and the pressure in the fluid coupling 1. As may be seen from Figure 2, a vent 20 in the accumulator 7 introduces atmospheric pressure to the fluid accumulated in the chamber 16. This atmospheric pressure will, with the valves in the above stated position, very rapidly force the fluid through the conduit 8 to the valve 9 from whence it will flow through the loading conduit 10 to the fluid coupling 1, filling the space between the input and output rotors thereof. Should any fluid pass on through the vacuum bleeder conduit 12 it will collect in chamber 15 of the accumulator 7 and will be allowed to pass through the partition 18 by means of the check valve 17. This arrangement as already noted above, positively pervents any of the fluid of the coupling from passing through the vacuum line 13 into the manifold or other source of vacuum.

When it is desired to render the coupling inoperative the valves 9 and 14 are closed, thus connecting the conduit 8 with the unloading conduit 11 and venting the conduit 13 to atmosphere through the vent 13b. The fluid is then rapidly forced by means of the pressure developed between the rotors of the fluid coupling out through the unloading conduit 11 to the accumulator chamber 16. With the fluid thus removed from the coupling 1, no torque is applied to the driven element 2c and hence no heat or power transfer is developed.

In order to control the maximum braking effort or torque absorption of the coupling, a pressure regulator valve 21 is provided. This valve is connected by means of conduit 22 to the conduit 11 and by means of conduit 23 to the conduit 8. With the valves 9 and 14 in the operative position so that the working compartment of the fluid coupling 1 is full, an increasing pressure will be developed in the unloading conduit 11. This pressure will also be induced in the conduit 22 which leads to the pressure regulator valve 21. When the pressure in the conduit 22 reaches a predetermined maximum, the pressure regulator valve 21, which is a one-way pressure responsive check valve, will open, thus allowing fluid under pressure to pass through the conduit 23, through the conduit 8 to the accumulator 7. This arrangement positively prevents pressure from exceeding ap redetermined value, which value is the safe operating load of the torque absorber 1.

It is contemplated that the three-way control valve 9 may be vacuum controlled rather than electrical. Under such a system, which is equivalent of the system shown, the switch 19 would be replaced by a vacuum valve and operation of the control switch 19 would then allow a vacuum to be induced in the valve 9 which would move the valve core of that valve to a position identical to that assumed upon electrical operation as in the present system. By using vacuum rather than electricity, it is possible to eliminate all electrical requirements of the unit should it be desired that the power input to the shaft 2 be operated by some power means not requiring electricity.

It will thus be seen from the above description that we have provided a novel control system for use in the operation of a hydrodynamic fluid brake and engine heater for vehicles.

It will be understood that modifications and variations may be effected without departing from the scope of the novel concepts of the present invention.

We claim as our invention:

1. In combination in a heat exchange apparatus, a fluid brake for generating heat, a source of fluid under atmospheric pressure for energizing said brake, a source of vacuum, a first conduit means for connecting said source of vacuum to said brake and second conduit means for connecting said source of fluid to said brake whereby said brake may be filled with said fluid upon opening of said first and second conduit means, said second conduit means being controlled by first valve means whereby when said first valve means is in open position, fluid will pass through said second conduit means to said brake from said source, and by-pass means responsive to pressure in said brake means to by-pass said first valve means whereby fluid will be transferred from said brake to said source at pressures above a predetermined maximum allowable brake pressure even though said first valve is closed.

2. In combination in a heat transfer mechanism, for vehicles, an accumulator, said accumulator comprising first and second chambers, said second chamber constituting a storage tank for fluid, said first chamber constituting a vacuum tank, a one-way valve between said chambers for allowing the passage of fluid from said first chamber to said second chamber, means for connecting said first chamber to a fluid brake heat generator, means for connecting said second chamber to said generator, said last named means comprising a three-way valve having an inlet from said second chamber, a first outlet to said brake and a second outlet to said brake, a second valve for controlling the vacuum in said first chamber and a third valve for by-passing said first valve by connecting said second outlet to said inlet upon the attainment of a predetermined pressure at said second outlet, whereby said brake will be rendered operative upon opening of said second valve and operation of said three-way valve to a position wherein said inlet and said first outlet are connected, and means for transferring the heat developed by said fluid brake to the engine cooling system of the vehicle.

3. A control system for operation of a fluid brake comprising a first three-way valve, a second vacuum control valve and a third pressure regulator valve and a source of brake operating fluid, first conduit means from said source to said three-way valve, second conduit means from said three-way valve to a fluid inlet of said brake, third conduit means from said three-way valve to a fluid outlet of said brake, fourth conduit means from said brake to said vacuum control valve and fifth conduit means from said third conduit means to said third pressure regulator valve and sixth conduit means from said pressure regulator valve to said first conduit, whereby actuation of said three-way valve to connect said first and second conduits will supply fluid to said brake and whereby operation of said second vacuum control valve will cause a pressure differential between said brake and said fluid source forcing fluid from said source through said first and second conduits to said brake, and whereby an increase in the pressure of the fluid within said brake beyond a predetermined value will cause said pressure regulator valve to open causing fluid to flow from said third conduit to said fifth conduit through said pressure regulator valve to said sixth conduit to said source and by-passing said three-way valve and limiting the torque absorption of said brake.

4. In combination in a heat exchange apparatus, fluid brake means operable as a heat generator when filled with operating fluid, accumulator means for supplying operating fluid, a three way valve having an inlet from said accumulator and first and second outlets to said fluid brake means, means for controlling said three way valve whereby said valve in a first position connects said inlet with the first outlet to allow fluid to flow to said brake and operable to a second position in which said inlet is connected to said second outlet whereby fluid is allowed to pass from a different position in said brake to said accumulator, and by-pass means between said inlet and said second outlet responsive to the fluid pressure of the working fluid in the fluid brake means to by-pass said three way valve when said pressure exceeds the maximum allowable braking pressure.

5. A combined engine heating and torque absorbing system for a vehicle comprising, a torque absorbing fluid coupling associated with the propeller shaft of said vehicle for absorbing the torque thereof when in a filled condition, a cooling fluid circulating system in heat exchange relation with said torque absorber and said vehicle engine whereby heat generated during torque absorption is transferred to said engine cooling system to increase the temperature of the engine, and a control system for said torque absorber, said control system comprising a source of working fluid for said absorber and valve means for controlling the flow of working fluid to and from said absorber, said valve comprising an inlet conduit connecting said valve with said source, a first outlet conduit connecting said valve with a fluid inlet into said torque absorber, a second outlet for said valve connecting said valve to an outlet of said absorber at which the working fluid in the absorber is at its maximum pressure developed by centrifugal force resulting from operation thereof, and means for controlling said three way valve whereby in a first position said valve connects said inlet to said first outlet to fill said torque absorber and render it operative as a torque absorber, and in a second position said valve connects said inlet to said second outlet to allow said coupling to unload under the influence of centrifugal force.

6. A combined engine heating and torque absorbing system for a vehicle comprising a torque absorbing fluid coupling associated with the propeller shaft of said vehicle for absorbing the torque thereof when in a filled condition, a cooling fluid circulating system in heat exchange relation with said torque absorber and said vehicle engine whereby heat generated during torque absorption is transferred to said engine cooling system to increase the temperature of the engine, and a control system for said torque absorber, said control system comprising a source of working fluid for said absorber and valve means for controlling the flow of working fluid to and from said absorber, said valve comprising an inlet conduit connecting said valve with said source, a first outlet conduit connecting said valve with a fluid inlet into said torque absorber, a second outlet for said valve connecting said valve to an outlet of said absorber at which the working fluid in the absorber is at its maximum pressure developed by centrifugal force resulting from operation thereof, and means for controlling said three way valve whereby in a first position said valve connects said inlet to said first outlet to fill said torque absorber and render it operative as a torque absorber, and in a second position said valve connects said inlet to said second outlet to allow said coupling to unload under the influence of centrifugal force, and vacuum means for moving said working fluid in the torque absorber filling direction.

7. In combination in a combined torque absorbing and engine heating apparatus for vehicles, a fluid brake for absorbing torque and generating heat, a source of fluid under atmospheric pressure for filling and thus energizing said brake and connected to said brake by a first conduit, a source of vacuum, a second conduit means for connecting said source of vacuum to said brake, and third conduit means for connecting said source of fluid to a discharge opening in the brake, whereby said brake may be filled and rendered operative upon opening of said first and second conduit means, said first conduit means being controlled by a first three-way valve means wherein fluid is permitted to pass to said brake when the valve is in a first position and fluid under centrifugal force developed by said brake is permitted to pass backwardly to said source of fluid through said third conduit when said valve is in a second position, and by-pass valve means responsive to pressure in said brake to by-pass said valve and to pass fluid back to said fluid source from said brake to thereby limit the fluid pressure developed in said brake.

8. In combination in a hydrodynamic torque absorber and engine heating mechanism for vehicles, a fluid controlled torque absorber, said torque absorber having a fluid inlet positioned at the median of the torus formed by the driving and driven elements of the coupling, a fluid outlet at the outer radius of said torus and a vacuum inlet positioned in said torus between said median and the inner periphery of said torus, a source of working fluid for said coupling, a three-way valve connecting said source to said fluid inlet and outlet and operative in a first position to connect said source to said fluid inlet and in said second position to connect said source to said outlet, said vacuum inlet providing a pressure differential causing fluid to flow from said source to said coupling, centrifugal force causing said coupling to unload when said valve is in said second position, and by-pass means connecting said source and said outlet for limiting the fluid pressure in said coupling to a predetermined value.

9. A vacuum control for rapidly regulating the fluid content of a hydrodynamic brake which comprises a fluid feed conduit communicating with the brake, a fluid discharge conduit communicating with the brake, a container for supplying fluid to and receiving fluid from said conduits, a valve controlling flow between said container and said conduits, a vacuum bleed conduit for selectively evacuating and venting said brake, and means for returning fluid entrained in the bleed conduit to said container whereby operation of said valve to a first position causes said brake to be evacuated and fluid to flow through said feed conduit to said brake and whereby operation of said valve to a second position causes the venting of said brake and the opening of said discharge conduit thereby allowing emptying of said brake under the influence of centrifugal force in said brake.

References Cited in the file of this patent

UNITED STATES PATENTS

| | | |
|---|---|---|
| 1,915,547 | North et al. | June 27, 1933 |
| 2,388,112 | Black et al. | Oct. 30, 1945 |
| 2,541,227 | Findley | Feb. 13, 1951 |
| 2,603,968 | Cline | July 22, 1952 |
| 2,634,830 | Cline | Apr. 14, 1953 |